United States Patent Office 2,841,593
Patented July 1, 1958

2,841,593

REACTION OF SUBSTITUTED BENZENE, CHLORINE, AND SUBSTITUTED MALEIC ANHYDRIDE AND PRODUCTS THEREOF

George G. Ecke, Detroit, Alfred J. Kolka, Birmingham, and William E. Burt, Royal Oak, Mich., assignors to Ethyl Corporation, New York, N. Y., a corporation of Delaware No Drawing. Application April 18, 1955
Serial No. 502,214

9 Claims. (Cl. 260—346.8)

This invention relates to a novel reaction in organic chemistry, and more particularly to a new organic reaction in which the simultaneous presence of three reactants alters the expected course of conventional bimolecular reactions and results in the formation of new and unusual products.

An object of this invention is to provide a new and useful reaction in organic chemistry. An additional object is to provide a new organic reaction in which the simultaneous presence of three reactants alters the normal course of conventional bimolecular reactions to cause a new reaction producing new and unexpected products. A further object is to provide a new reaction between aromatic compounds, unsaturated compounds, and free chlorine atom-yielding substances to produce novel products which are useful in the fields of chemistry, agriculture, plastics, etc. An additional object is to provide a potentially reactive composition comprising an aromatic material, an unsaturated compound, and a free chlorine atom-yielding substance. A specific object of the present invention is to provide a new chemical reaction of benzene, chlorine, and maleic anhydride.

It has now been discovered that the course of reaction of certain aromatic compounds with free chlorine atom-yielding materials, and simultaneously the course of reaction of certain unsaturated materials with free chlorine atom-yielding substances, can be substantially changed by causing the three components; namely, the aromatic material, the unsaturated material, and the free chlorine atom-yielding material, to be placed together under conditions whereby normally the aromatic material reacts with the free chloride atom-yielding material, the unsaturated material reacts with the free chlorine atom-yielding material, but the aromatic material does not react with the unsaturated material. Under these conditions we have unexpectedly found that instead of the normal reactions between the aromatic compound and the free chlorine atom-yielding substance, and between the unsaturated material and the free chlorine atom-yielding material, a different reaction takes place in which all three materials combine to form new and novel products or mixtures of products derived from the three reactants.

Our invention contemplates the conducting of reactions as described in the above paragraph and also the formation of the potentially reactive mixture which leads to this reaction; namely, the mixture of the aromatic compound, the olefin, and the free chlorine atom-yielding material. Our invention also contemplates the new and useful products formed by the process of the present invention.

The products formed by our reaction are extremely useful as chemical intermediates, plasticizers, agricultural chemicals, and the like. For example, one product formed in one aspect of our invention; namely, phenylchlorosuccinic anhydride, is a novel chemical intermediate for the formation of valuable materials as phenylmaleic anhydride, esters of phenylchlorosuccinic acid, anilides of phenylchlorosuccinic acid, phenylchlorosuccinic acid itself, phenylmaleic acid, and the like.

Perhaps the best way to further illustrate the above invention is to describe a typical example. In this example the aromatic substance is benzene, the unsaturated substance is maleic anhydride, and the free chlorine atom-yielding substance is chlorine. When benzene is caused to react with chlorine in the presence of light, reaction takes place by addition of chlorine to the double bonds of benzene to produce ultimately 1,2,3,4,5,6-hexachlorocyclohexane (commonly known as benzene hexachloride). Maleic anhydride reacts with chlorine in the presence of light by addition of chlorine to the carbon-to-carbon double bond of maleic anhydride to produce $\alpha,\alpha'$-dichlorosuccinic anhydride. Benzene does not react with maleic anhydride in the presence of light under any known conditions. We have found surprisingly that when a mixture of benzene and maleic anhydride are irradiated and chlorine is passed through the mixture, there is essentially no reaction of benzene and chlorine to produce benzene hexachloride, and there is essentially no reaction of maleic anhydride and chlorine to produce $\alpha,\alpha'$-dichlorosuccinic anhydride. Instead, a new and unexpected reaction occurs in which all three of the reactants unite to produce products containing radicals derived from all three reactants. Specifically, these materials react to produce a compound which is probably $\alpha$-phenyl-$\alpha'$-chlorosuccinic anhydride and simultaneously $\alpha$-(pentachlorocyclohexyl)-$\alpha'$-chlorosuccinic anhydride.

In connection with the above products formed, it should be noted that the (pentachlorocyclohexyl)-chlorosuccinic anhydride is of a relatively low order of stability and tends to decompose during reasonably careful handling, particularly at elevated temperature and/or in the presence of dehydrochlorinating agents into (pentachlorocyclohexy)-maleic anhydride. For this reason we find that we usually isolate this latter material directly from our reaction mixtures.

We have further found that our reaction is primarily applicable to a selected class of compounds. We have found that in the case of the aromatic reactant the compounds which best undergo our reaction are those which are characterized by being less reactive toward electrophilic nuclear substitution than ethers of the benzene series, and more reactive toward electrophilic nuclear substitution than aldehydes of the benzene series. By electrophilic nuclear substitution we mean ordinary aromatic substitution of the type in which an aromatic material such as benzene is reacted with an electrophilic reactant such as nitric acid, sulfuric acid, sulfur trioxide, alkyl halides, acid chlorides, acid anhydrides, and the like. Although the reactions of our invention most likely proceed by way of free radical mechanisms, it has been found that the aromatic materials of interest are best defined by consideration of ionic substitution of the electrophilic type. A list of aromatic compounds in order of decreasing reactivity towards electrophilic substitution, as collated from the works of experts in the field, such as Fieser, Wheland, Hammett, and others, is as follows: dialkyl amines>unsubstituted amines>acylated amines> acylated phenols>ethers>alkyl benzenes>aryl benzenes> carboxyalkyl benzenes such as phenylacetic acid>benzene itself>phenyl halides>benzyl halides>carboxybenzenes> carbalkoxybenzenes>aldehydes of the benzene series> cyanobenzenes>nitrobenzenes. In other words, each compound on the above list is more reactive towards electrophilic nuclear substitution than each compound that succeeds it. As stated above, we have found that the aromatic compounds which take part in our reaction are those less reactive toward electrophilic nuclear substitution than the ethers of the benzene series and more reactive toward electrophilic nuclear substitution than aldehydes of the benzene series. Thus the aromatic compounds which we employ are selected from the class consisting of alkylbenzenes such as toluene, ethylbenzene, n-propylbenzene, isopropylbenzene, xylenes, methylethylbenzenes and the like; arylbenzenes such as biphenyl, terphenyl, quadriphenyl, sexiphenyl and the like; carboxyalkylbenzenes such as phenylacetic acid, α-phenylpropionic acid, β-phenylpropionic acid, p-tolylacetic acid and the like; benzene; halobenzenes such as chlorobenzene, bromobenzene, iodobenzene, dichlorobenzenes, trichlorobenzenes, tetrachlorobenzenes and the like; alkylbenzenes halogenated in the side chain such as benzylchloride, benzalchloride, benzotrichloride, α-bromoethylbenzene, β-bromoethylbenzene, dibromoethylbenzene, α,α′-dichloroxylenes and the like; carboxylated benzenes such as benzoic acid, p-toluic acid, diphenic acid, o-chlorobenzoic acid and the like; and carbalkoxybenzenes such as methyl benzoate, ethyl benzoate, other alkyl benzoates, methyl-p-toluate, methyl-o-chlorobenzoate, ethyl-o-chlorobenzoate, amylbenzoate and the like. In general the aromatic reactant should have zero to five substituents on the benzene ring.

It is possible also to characterize the aromatic compounds of our invention by means of dipole moment. The aromatic compounds of our invention can be described as those containing electron attracting groups and having a dipole moment less than 2.75, those having zero dipole moment, and those containing electron repellent groups and having a dipole moment less than 1.16. When defined this way, it is seen that the aromatic compounds of our invention form a continuous series beginning with compounds having electron attracting groups and of reasonably high dipole moments, progressing through compounds having electron attracting groups of progressively smaller dipole moments, through compounds having zero dipole moments; and on the other side through compounds having electron repelling groups and having dipole moments up to a moderate value. It will be found that when designated in this manner, the compounds which the definition embraces are those meeting the requirements of the broader definition of being less reactive towards electrophilic nuclear substitution than ethers of the benzene series and more reactive towards electrophilic nuclear substitution than aldehydes in the benzene series.

Of the above aromatic reactants, we prefer to use benzene because of its generally greater reactivity and low cost.

The preferred unsaturated compounds of our invention can be described as being selected from the class consisting of maleic anhydride and halomaleic anhydride, such as chloro- and bromomaleic anhydrides. Of these, maleic anhydride is especially preferred.

As the source of free chlorine atom, any compound which yields free chlorine atoms in the presence of a free radical initiator can be used. Preferably our source of free chlorine atom is selected from the class consisting of chlorine, sulfuryl chloride, phosgene and phosphorus pentachloride. Chlorine is the preferred free chlorine atom-yielding reactant.

As the reaction initiator we can use any initiator for reactions of the free radical type. Our free radical initiator is preferably selected from the class consisting of light; organic peroxides such as benzoyl peroxide, acetyl peroxide, di-tert-butyl peroxide and the like; benzenediazoacetate; α,α′-azobisisobutyronitrile; tetraalkylleads such as tetraethyllead, tetramethyllead, diethyldimethyllead and the like; and nuclear radiation. Light is our preferred free radical initiator.

We have found that our reaction is operable over a wide range of reaction conditions. For example, it can be pointed out that the reaction proceeds with the organic reactants in either liquid or vapor phase. The temperature of operation will vary with the use of liquid or vapor phase reaction and also will vary with the particular reactants employed. In the liquid phase it is possible to operate our reaction at temperatures below 0° C. This is especially true when inert diluents such as carbon tetrachloride, chloroform, tetrachloroethane, acetic acid, and the like are used. Generally we prefer to operate between the melting point of the lower melting organic reactant and the boiling point of the reaction mixture at the pressure employed. In the case of benzene, our preferred reactant, for example, the preferred temperature range in liquid phase reaction is from about 5 to 85° C. Particular preference is given to temperatures in the upper portion of this range, such as from 65 to 85° C., since the reaction rate is faster at these temperatures. When using vapor phase operation, we prefer to use temperatures at which all reactants are in the vapor state at the pressures used. We have used temperatures of as high as 500° C. when operating in the vapor phase.

The pressure of our operation may vary from subatmospheric to superatmospheric. In liquid phase operation we ordinarily use atmospheric pressure, and in vapor phase ordinarily we use reduced pressure, although superatmospheric pressure can be used if desired.

The concentrations of reactants in our reaction can also vary widely. Generally we prefer to use an excess of the aromatic reactant to serve as the reaction solvent when carrying out the reaction is liquid phase. We can use mole ratios of aromatic reactant to unsaturated reactant of as high as 10 to 1 with good results. The concentration can also be controlled by use of an inert diluent in the reaction. This is especially beneficial when it is desired to use temperatures appreciably lower than the melting point of lower melting reactant. In this connection, it should be pointed out that use of inert diluents has some effect on the distribution of reaction products. This is illustrated in Example VII of the present specification. We can also achieve successful results when the mole ratio of the organic reactants is as low as 1 to 1 or even lower. Generally, however, we prefer mole ratios of aromatic reactant to unsaturated reactant of about 2 to 1 or higher.

The amount of the free chlorine atom-yielding substance most preferably employed is best defined in terms of its ratio with respect to the unsaturated reactant. For best results we prefer to use a mole ratio of the free chlorine atom-yielding material to the unsaturated material of about 1 to 1. However, higher and lower ratios can be used. We have used mole ratios as low as 0.5 to 1 and as high as 1.5 to 1.

With respect to the free radical initiator, both light and chemical compounds can be used. As will be shown in some of the subsequent examples, it is possible to conduct our reaction so as to contain two different types of products, which may be described as "low chlorine" products and "high chlorine" products. With one group of reactants (benzene, maleic anhydride, and chlorine) the low chlorine product is phenylchlorosuccinic anhydride, and the high chlorine product is (pentachlorocyclohexyl)-chlorosuccinic anhydride. We have found that the variation in light intensity when light is used as the initiator will affect the degree to which the low chlorine and high chlorine products are formed. With high intensity light, predominantly the low chlorine product is produced, and low intensity light favors formation of the high chlorine product. With chemical free radical initiators we have not observed this selectivity phenomenon to such a marked extent. With the use of chemical free radical initiators enough should be used to keep the reaction going at a reasonable rate. Generally speaking, this amount will be up to about 5 percent based on the weight of aromatic reactant.

Our invention will be more fully illustrated by the following examples, in which all parts and percentages are parts and percentages by weight unless otherwise designated.

Example I

The reactor was a pot type vessel equipped with mechanical agitator, gas inlet tube, reflux condenser, temperature measuring device, and heating and cooling means.

In this reactor was placed a solution of 88 parts maleic anhydride in 280 parts of benzene. The solution was dried by distilling off a small portion of the benzene. Nitrogen was introduced through the chlorine inlet tube for a few minutes, and the mixture was then heated to 75° C. The solution was then illuminated by General Electric sun lamps, the nitrogen flow stopped, and the addition of chlorine begun. After a 3 to 5 minute induction period the yellow color of the reaction mixture disappeared, and a slight exothermic effect was noted. Sixty-four parts of chlorine was introduced over a 2.5 hour period, during which time the evolution of a large amount of hydrogen chloride was noted. The reaction product, a colorless liquid, was distilled at atmospheric pressure until a pot temperature of 125° C. was reached, at which time distillation was continued under 20 mm. vacuum at a pot temperature of 50 to 60° C. This distillation was continued until all the benzene was removed. The benzene-free product comprises 202 parts of a viscous yellow liquid which could be induced to crystallize to a solid crystalline mass by allowing to stand for several days at room temperature. The low chlorine product was isolated by addition of ether to the yellow viscous residue, which caused precipitation of a solid melting at 89–94° C. The melting point of this material was raised to 103–104° C. by recrystallization from ether and benzene. This material, which is the "low chlorine" product referred to above, is a phenylchlorosuccinic anhydride, probably the α-phenyl-α'-chloro isomer. The white crystalline material has a chlorine content of 17.2 percent (theoretical for phenylchlorosuccinic anhydride, 16.9 percent).

An alternate method of isolation of reaction products is as follows: The benzene-free product obtained above was distilled at 1 to 2 mm. pressure, yielding the following cuts: Cut 1, boiling point 40–120° C., comprised 23 parts of material which is largely unreacted maleic anhydride. Cut 2 boiled at 120–190° C. and comprised 103 parts of the phenylchlorosuccinic anhydride product. The residue from this distillation comprised 51 parts of glassy material having a chlorine content of 45.4 percent. This product is derived from the "high chlorine" product referred to above by dehydrohalogenation and is impure (pentachlorocyclohexyl)-maleic anhydride. As was pointed out earlier in the specification, this is derived from dehydrohalogenation of the relatively unstable (pentachlorocyclohexyl)-chlorosuccinic anhydride.

The procedure of Example I can be modified as follows: the temperature can be varied from below 0 to about 85° C., preferably 65–85° C. We have varied the chlorine introduction time from 1 hour to 4 hours with good results. We can vary the ratio of benzene to maleic anhydride from about 1 to 1 (preferably at least 2 to 1) to 10 to 1 and even higher with good results. We can vary the ratio of chlorine to maleic anhydride from about 0.5 to 1 to about 1.5 to 1 with good results.

The following examples demonstrate the identity and utility of the products obtained in Example I. In general we find very useful a combination process comprising reacting benzene, chlorine and maleic anhydride in the presence of a free radical initiator selected from the class consisting of light, organic peroxides, benzenediazoacetate, α,α'-azobisisobutyronitrile, tetraalkylleads and nuclear radiation, recovering phenylchlorosuccinic anhydride from the reaction mixture and dehydrochlorinating said phenylchlorosuccinic anhydride by means of heat, dehydrochlorination catalysts such as charcoal, other forms of carbon and the like or chemical dehydrochlorinating agents such as sodium hydroxide, potassium hydroxide and the like.

Example II

The phenylchlorosuccinic anhydride product of Example I was dehydrochlorinated to phenylmaleic anhydride by heating the molten product until fuming ceased. After a single recrystallization from ether, the dehydrochlorinated product melted at 119–120° C. and gave a mixed melting point with an authentic sample of phenylmaleic anhydride of 120° C. After recrystallization from chloroform, followed by sublimation, this product had a carbon content of 68.94 percent and hydrogen content of 3.59 percent. Calculated values for phenylmaleic anhydride are carbon, 68.98 percent and hydrogen, 3.47 percent.

The phenylchlorosuccinic anhydride product can also be dehydrochlorinated by other means. One elegant way of accomplishing the dehydrochlorination is by heating the material in the presence of catalytic quantities of charcoal or other forms of carbon. When this is done, it is found that the dehydrochlorination will proceed below the melting point of the phenylchlorosuccinic anhydride. Other catalysts effective in this reaction include metal halides such as ferric chloride, and high-surface solids such as pumice, diatomaceous earth, bentonite and the like. Chemical dehydrochlorinating agents such as tert-amines, sodium hydroxides and other basic hydroxides, soda ash, lime and the like also give good results in the dehydrochlorination.

Example III

The phenylchlorosuccinic anhydride product of Example I was converted to the free acid by exposure to moist air for 16 days. At the end of 16 days the melting point of the residue was 172° C.

The free phenylchlorosuccinic acid was also produced by recrystallization of the anhydride from wet benzene, followed by recrystallization from ether-isooctane solvent pair. This gave a product melting at 175° C. and having the following characteristics: chlorine content, 15.6 percent; neutral equivalent, 117. The calculated values for chlorophenylsuccinic acid are: chlorine content, 15.6 percent; neutral equivalent, 114.2.

The infrared spectrum of the chlorophenylsuccinic acid produced by each of the above two methods was identical with that of the product produced by the other method.

Other derivatives also can be prepared with the techniques ordinarily used for reactions of acid anhydrides. For example, reaction of the phenylchlorosuccinic anhydride with methyl alcohol yields the monomethyl ester of phenylchlorosuccinic acid, melting point after recrystallization from benzene, 148–151° C.; chlorine content, 14.9 percent (theoretical, 14.63 percent). Reaction with aniline yields the monoanilide of phenylchlorosuccinic acid, melting point, 165–168° C. (decomposition); chlorine content, 12.02 percent (theoretical, 11.71 percent).

Example IV

The phenylmaleic anhydride produced in Example II was further identified by its conversion to a known derivative; namely, its Diels-Alder adduct with anthracene by the procedure of Miller and Mann, J. Am. Chem. Soc., 72, 1484 (1950). The adduct melted at 164–168° C. Miller and Mann report a melting point of 166–168° C.

Example V

The (pentachlorocyclohexyl)-maleic anhydride product of Example I was dissolved in benzene and treated with an aqueous solution of sodium hydroxide. The mixture was heated and the benzene distilled off to yield a clear dark red solution. To this was added solid potassium permanganate in small batches with vigorous stirring. The addition of the permanganate caused a temperature rise of 45° C. The reaction mixture was filtered, and the pH of the filtrate was adjusted to the phenolphthalein end point with 12 N hydrochloric acid. The solution was then evaporated to about ⅔ of its original volume, acidified, and extracted with ether. Evaporation of the ether extract yielded a white solid comprising a mixture of isomeric dichlorobenzoic acids, which was sublimed to give material melting at 140–180° C. From this product was isolated by fractional crystallization a product which was identified as 3,4-dichlorobenzoic acid, melting point, 202° C.; neutral equivalent, 190. The literature melting point for 3,4-dichlorobenzoic acid is 203–204° C. and the theoretical neutral equivalent is 191.

The explanation for the formation of 3,4-dichlorobenzoic acid and other dichlorobenzoic acids in the above example is as follows: The primary product of the reaction of Example I; namely, (pentachlorocyclohexyl)-chlorosuccinic anhydride, is so unstable that it easily loses hydrogen chloride on heating to yield as the first decomposition product (pentachlorocyclohexyl)-maleic anhydride. This product in turn loses three molecules of hydrogen chloride from the cyclohexyl ring on treatment with sodium hydroxide solution to produce the aromatized dichlorophenylmaleic anhydride, and the latter products on oxidation with permanganate are oxidized to corresponding dichlorobenzoic acids.

Dehydrochlorination of (pentachlorocyclohexyl)-maleic anhydride can also be carried out by other chemical means as well as thermally and in the presence of catalysts such as carbon, amines, ferric salts, and the like.

The following group of examples illustrates further variations in the process of our invention and in the potentially reactive mixtures and products.

*Example VI*

The procedure of Example I (with the distillation method of isolation of products) is carried out except that the reaction is conducted at a temperature of 32° C. The yield of (pentachlorocyclohexyl)-maleic anhydride is 71 parts. The infrared spectrum of this product was identical with that of the product of Example I.

*Example VII*

A mixture comprising 19.6 parts of maleic anhydride and 17.2 parts of benzene dissolved in 709 parts of carbon tetrachloride was treated with 14.5 parts of chlorine over a period of 40 minutes at 70–75° C. The reaction mixture was irradiated with light of medium intensity. Distillation of the carbon tetrachloride yielded 57 parts of residue which on distilling at a pressure of 2 mm. yielded 17.5 parts of (pentachlorocyclohexyl)-maleic anhydride having a chlorine content of 51.5 percent. This product had an infrared spectrum identical to that obtained in Examples I and VI. The (pentachlorocyclohexyl)-maleic anhydride is a tacky glass-like substance which resists ordinary attempts at crystallization. As usually prepared, it has a certain amount of color varying from orange to black.

*Example VIII*

The reactor in this example was a vertically mounted transparent tube containing a thermocouple well and exothermically controlled heating means. The reactor was packed with 5 mm. glass spheres. To the top of this reactor was added a mixture of 92 parts benzene, 29 parts maleic anhydride, and 26 parts fo chlorine. These reactants were introduced over a period of 1.5 hours at a temperature of 300–450° C. The product was condensed as it left the reactor and was distilled at 3 mm. pressure. This yielded a residue which, after recrystallization from ether, proved to be phenylmaleic anhydride.

Other modes of our invention are demonstrated by the following examples.

*Example IX*

A solution of 74 parts maleic anhydride and 234 parts of benzene was dried by azeotropic distillation. To the dried solution 100 parts of sulfuryl chloride was added, and this mixture was refluxed for 10 hours in the presence of 2.5 parts of benzoyl peroxide. The product was distilled at a temperature of 115° C. to yield 108 parts of orange residue. Distillation of this residue yielded a fraction boiling at 130–195° C. at 20 mm., which product, upon two recrystallizations from ether, gave a solid melting at 102–104° C. The melting point of a mixture of this product and the product from Example I was not depressed. Dehydrochlorination of the product of the present example with triethyl amine yielded phenylmaleic anhydride melting at 120–121.5° C.

*Example X*

Three hundred and thirty parts of chlorobenzene, 78 parts of maleic anhydride, and 57 parts of chlorine were reacted for 3 hours at 70–80° C. with illumination. The product of this reaction was distilled at 12 mm. to yield a cut boiling at 195–235° C. containing 38.7 parts of product. This material had a neutral equivalent of 100–114 and a chlorine content of 32.6 percent. This material was neutralized to the phenolphthalein end point by aqueous sodium hydroxide and then oxidized with potassium permanganate to yield a mixture of chlorobenzoic acids. This demonstrates the formation of a new carbon-to-carbon bond during the reaction between the chlorobenzene and the maleic anhydride.

*Example XI*

At a temperature of 40–50° C., 156 parts of maleic anhydride, 585 parts of toluene, and 114 parts of chlorine were reacted for 2 hours. At the end of this time the bulk of the unreacted toluene was removed by distillation at atmospheric pressure. The product was distilled at 25 mm. to yield a cut of 23.8 parts boiling at 120–200° C. After neutralization with sodium hydroxide solution this cut was oxidized with potassium permanganate and then esterified with methanol in the presence of a small amount of sulfuric acid to yield dimethyl terephthalate, melting point and mixed melting point, 138–140° C. This proves the formation of a new carbon-to-carbon bond between the carbon atom para to the methyl group and the maleic anhydride.

*Example XII*

At a temperature of 60–65° C., 391 parts of benzotrichloride, 49 parts of maleic anhydride, and 35 parts of chlorine were reacted for 3 hours. The resulting mixture was distilled from a Claisen flask to yield a cut of 39.0 parts boiling at 140–290° C. at 20 mm. On redistillation this yielded a material boiling at 240–280° C. at 20 mm. (29.6 parts). This material was hydrolyzed with aqueous caustic solution by refluxing for two hours. It was then acidified and extracted with ether to yield 6.5 parts of solid residue. This was oxidized with potassium permanganate to yield a white powder melting above 150° C. This white powder was refluxed with methanol containing a small amount of sulfuric acid for 3 hours, the solution poured into water, and the solid filtered out. After twice recrystallizing from methanol the product was identified as dimethyl terephthalate, melting point and mixed melting point, 138–140.5° C. This shows the formation of a new carbon-to-carbon bond between the carbon atom para to the benzotrichloride group and the maleic anhydride.

*Example XIII*

A solution of 380 parts of methyl benzoate and 74.6 parts of maleic anhydride was reacted with 50 parts of chlorine over 2.75 hours. The product was distilled to yield a fraction of 38.3 parts boiling at 160–255° C. at 3–10 mm. A portion of this cut was dissolved in aqueous base and oxidized in potassium permanganate to yield a white solid having neutral equivalent 92. This material was refluxed with 59 ml. of methanol containing a small amount of sulfuric acid for six hours. The mixture was poured into water, the resultant solid filtered out and recrystallized from methanol to yield dimethyl terephthalate, melting point and mixed melting point, 138–140° C. Formation of this material demonstrates that a new carbon-to-carbon bond was formed between the carbon atom para to the carbmethoxy group and the maleic anhydride.

*Example XIV*

In the same manner as in the preceding examples, 250 parts of benzene, 106 parts of chloromaleic anhydride, and 56 parts of chlorine were reacted at 75° C. for 4.3 hours. After removal of unreacted benzene by distillation at 50° C./2 mm., a residue of 176 parts was recovered. This residue was distilled at 3–5 mm. yielding a fraction of 47 parts boiling at 90–195° C. This fraction was dissolved in excess aqueous sodium hydroxide solution and extracted with ether to remove neutral constituents. The extracted aqueous solution was then acidified and extracted with ether again. The ether was evaporated yielding a solid residue which was sublimed and recrystallized from carbon tetrachloride, isooctane, and ether to yield phenylchloromaleic anhydride, melting point, 84–85° C.; neutral equivalent, 103.5; chlorine content, 17.7 percent (the literature melting point is 83–84° C., the theoretical neutral equivalent is 104.3, and the theoretical chlorine content is 17.02 percent).

The above results demonstrate that the initial product, phenyldichlorosuccinic anhydride is so unstable as to undergo dehydrochlorination during the work-up procedure to yield phenylchloromaleic anhydride.

*Example XV*

In the same manner as in the preceding examples biphenyl and chloromaleic anhydride are reacted with phosgene in the presence of benzenediazoacetate as a free radical initiator. Good results are obtained.

*Example XVI*

In a similar manner β-phenylpropionic acid is reacted with maleic anhydride and phosphorus pentachloride in the presence of α,α'-azobisisobutyronitrile as a free radical initiator. Good results are obtained.

*Example XVII*

Benzoic acid, chlorine and maleic anhydride are reacted according to the procedure of the preceding examples using tetraethyllead as the free radical initiator. Results are obtained similar to those of the previous examples.

*Example XVIII*

Benzene, chlorine and maleic anhydride are reacted according to the procedure of Example I except that the free radical initiator is nuclear radiation using cobalt 60 as the source. Results similar to those of Example I are obtained.

Use of aryl benzenes such as biphenyl, carboxy alkyl benzenes such as phenylacetic acid, and carboxylated benzenes such as benzoic acid gives good results in the procedures of the examples of this specification.

We claim:

1. A process which comprises reacting an aromatic compound selected from the class consisting of alkylbenzenes, arylbenzenes, carboxyalkylbenzenes, benzene, halobenzenes, alkylbenzenes halogenated in the side chain, carboxylated benzenes and carbalkoxybenzenes with an olefin selected from the class consisting of maleic anhydride, chlorinated maleic anhydride and brominated maleic anhydride and a source of free chlorine atom selected from the class consisting of chlorine, sulfuryl chloride, phosgene and phosphorus pentachloride in the presence of a free radical initiator selected from the class consisting of light, organic peroxides, benzenediazoacetate, α,α'-azobisisobutyronitrile, tetraalkyllead and nuclear radiation, to produce an organochlorosuccinic anhydride wherein the organo group is derived from said aromatic compound; the molar ratio of said aromatic compound reactant to said olefin reactant being 1:1 to 10:1 and the molar ratio of said source of free chlorine atom to said olefin reactant being 0.5:1 to 1.5:1; the reaction being carried out at a temperature of 0 to 500° C.

2. A process which comprises reacting benzene, maleic anhydride and chlorine in the presence of light; the molar ratio of benzene to maleic anhydride being 1:1 to 10:1 and the molar ratio of chlorine to maleic anhydride being 0.5:1 to 1.5:1; the reaction being carried out at a temperature of 0 to 500° C.

3. As a new composition of matter, a compound selected from the group consisting of (pentachlorocyclohexyl)-maleic anhydride and α-phenyl-α'-chlorosuccinic anhydride.

4. As a new composition of matter, α-phenyl-α'-chlorosuccinic anhydride.

5. As a new composition of matter (pentachlorocyclohexyl)-maleic anhydride.

6. The process of claim 1 wherein said olefin is maleic anhydride.

7. The process of claim 1 wherein said olefin is chloromaleic anhydride.

8. A combination process which comprises reacting benzene, chlorine and maleic anhydride in the presence of light; the molar ratio of benzene to maleic anhydride being 1:1 to 10:1 and the molar ratio of chlorine to maleic anhydride being 0.5:1 to 1.5:1; the reaction being carried out at a temperature of 0 to 500° C.; recovering phenylchlorosuccinic anhydride from the reaction mixture and dehydrochlorinating said phenylchlorosuccinic anhydride to phenylmaleic anhydride by heating it to a temperature at which dehydrochlorination takes place.

9. The process of claim 8 wherein the dehydrochlorination is conducted in the presence of a material selected from the group consisting of carbon, sodium hydroxide, potassium hydroxide, ferric chloride, pumice, diatomaceous earth, bentonite, tertiary amines, soda ash, and lime.

References Cited in the file of this patent

UNITED STATES PATENTS

| | | |
|---|---|---|
| 1,741,305 | Jaeger | Dec. 31, 1929 |
| 2,121,183 | Binapfl | June 21, 1938 |
| 2,391,261 | Milone | Dec. 18, 1945 |
| 2,425,509 | Clifford | Aug. 12, 1947 |
| 2,432,470 | Clifford | Dec. 9, 1947 |
| 2,692,270 | Beavers | Oct. 19, 1954 |
| 2,707,197 | Souillard | Apr. 26, 1955 |

FOREIGN PATENTS

| | | |
|---|---|---|
| 1,026,067 | France | Jan. 28, 1953 |
| 569,174 | Great Britain | May 10, 1945 |